Sept. 23, 1969  K. RODER  3,468,565
COUPLING HAVING CAM MEANS TO PREVENT RELATIVE
ROTATION AND AXIAL SEPARATION
Filed June 28, 1968

INVENTOR
KARL RODER
BY Craig & Antonelli
ATTORNEYS

United States Patent Office 3,468,565
Patented Sept. 23, 1969

3,468,565
COUPLING HAVING CAM MEANS TO PREVENT RELATIVE ROTATION AND AXIAL SEPARATION
Karl Roder, Stuttgart-Monchfeld, Germany, assignor to Daimler-Benz Aktiengesellschaft, Stuttgart-Unterturkheim, Germany
Filed June 28, 1968, Ser. No. 741,176
Claims priority, application Germany, July 1, 1967, 1,630,311
Int. Cl. F16l 41/00, 5/00
U.S. Cl. 285—194                                   21 Claims

ABSTRACT OF THE DISCLOSURE

An arrangement for securing a pin or lug part at a wall, in particular for securing a full-load stop for the drive pedal of motor vehicles in the engine wall, in which a preferably cylindrical extension of the pin or lug part is adapted to be axially inserted in a form-locking manner into a fixed socket of the wall until it reaches an abutment position; the extension has at least one radial cam portion of a first type to permit its axial locking and at least one radial cam portion of a second type for its circumferential locking; the socket, in turn, has corresponding axial grooves for the cam portions of both types to enable the axial insertion whereby, in the abutment position, the cam portions of the first type are axially offset with respect to the corresponding grooves while the cam portions of the second type engage at least in part in the corresponding grooves; the grooves for the cam portions of the second type pass over into cam tracks whose distance $a$ to the axis of the extension is smaller than the corresponding distance (radius $r$) of the engaging surfaces at the associated elastic cam portions co-operating with these cam tracks, and the extension is adapted to be rotated with respect to the socket from an abutment position into a locking position in which the cam portions of the first type engage with radial abutment portions at the socket while the cam portions of the second type engage with the cam tracks.

---

The present invention relates to a securing means of a pin or plug part at a wall, especially of a full-load stop for the foot or drive pedal of vehicles.

The aims underlying the present invention essentially reside in creating a fastening and securing arrangement of the aforemetioned type which excels by slight expeditures in connection means and ease of assembly.

For this purpose, a securing means of the aforementioned type is proposed according to the present invention in which a preferably cylindrical extension of the pin part is adapted to be axially inserted form-lockingly into a fixed socket of the wall up to an abutment position. The extension is provided with at least one radial cam portion of a first type for its axial locking and with at least a radial cam portion of a second type for its locking in the circumferential direction with respect to the socket. The socket is provided for purposes of the axial insertion of the extension with corresponding axial grooves for each of the cam portions of the first as well as also of the second type. In the abutment position of the extension, the cam portions thereof of the first type are axially offset to the corresponding grooves whereas the cam portions of the second type engage at least over a part of their axial extent into the corresponding grooves. The grooves for the cam portions of the second type pass over in the same circumferential direction into one cam track each, whose perpendicular distance to the axis of the extension is smaller than the corresponding distance of the engaging surface for the cam track at the associated elastic cam portion. The extension is rotatable with respect to the socket out of the abutment position into a locking position so that the cam portions of the first part come ino engagement with corresponding radial abutment portions at the socket and the cam portions of the second type come into engagement with the cam tracks.

Accordingly, it is an object of the present invention to provide an arrangement for securing a pin or pivot part at a wall, especially of a full-load stop for the drive pedal of vehicles which avoids by extremely simple means the aforementioned shortcomings and drawbacks encountered in the prior art.

Another object of the present invention resides in a securing and fastening means of a pin part at a wall, especially of a full-load stop for the drive pedal of vehicles which involves very slight expenditures in the connecting means thereof.

A further object of the present invention resides in an arrangement for securing and fastening a full-load stop for the drive pedal of vehicles in the fire wall of the engine which permits easy assembly and disassembly by means of simple tools.

These and further objects, features, and advantages of the present invention will become more obvious from the following description when taken in connection with the accompanying drawing which shows, for purposes of illustration only, one embodiment of a full-load stop for a drive pedal, on an enlarged scale, in accordance with the present invention, and wherein.

Figure 1:
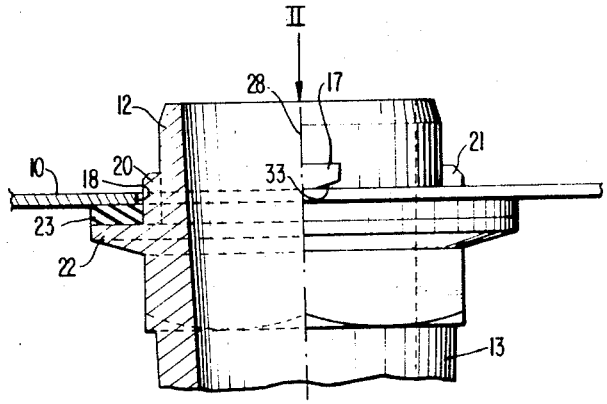
FIGURE 1 is a cross-sectional view through the securing arrangement of the present invention, taken along line I—I of FIGURE 2.

Referring now to the drawing wherein like reference numerals are used throughout the various views to designate like parts, a circularly shaped socket 11 for a cylindrical extension 12 at a pin-shaped full-load stop 13 is punched or stamped out of the fire wall 10 of a motor vehicle. The socket 11 is provided at the circumference with two axial grooves 14 and 15 for a respective cam portion 16 and 17 each of a first type as well as with two further grooves 18 and 19 for a respective cam portion 20 and 21 each of a second type provided at the extension 12. The cam portions 16 and 17 of the first type serve for the axial fastening of the extension in the socket 11 whereas by means of the cam portions 20 and 21 of the second type a locking of the extension 12 against rotation with respect to the socket 11 can be achieved.

Figure 3:
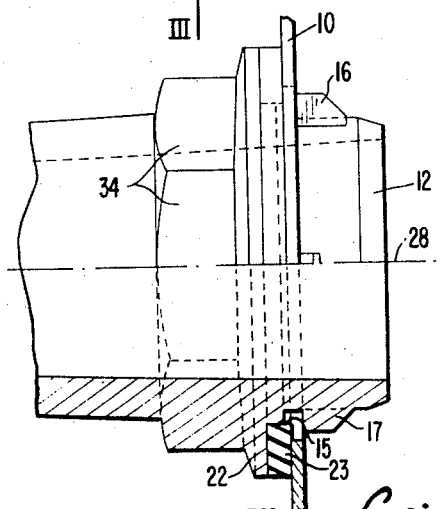
FIGURE 3 is a further cross-sectional view through the securing arrangement taken along line III—III of FIGURE 2.

The extension 12 is axially inserted with its cam portions into the socket 11 in a form-locking manner. In the drawing, the parts 11 and 12 are illustrated in the abutment position which is determined by a collar 22 of the full-load stop 13; the collar 22 is supported at the fire wall 10 by way of an elastic sealing ring 23. In the illustrated abutment position of the parts 11 and 12, the cam portions 16 and 17 of the first type are axially offset (FIG. 3) with respect to the corresponding grooves 14 and 15 for the purpose of the axial fastening of the extension 12 whereas the cam portions 20 and 21 of the second type which, like the full-load stop 13 and the other parts thereof, consist of synthetic resinous material, engage in the associated grooves 18 and 19 (FIG. 1).

Figure 2:
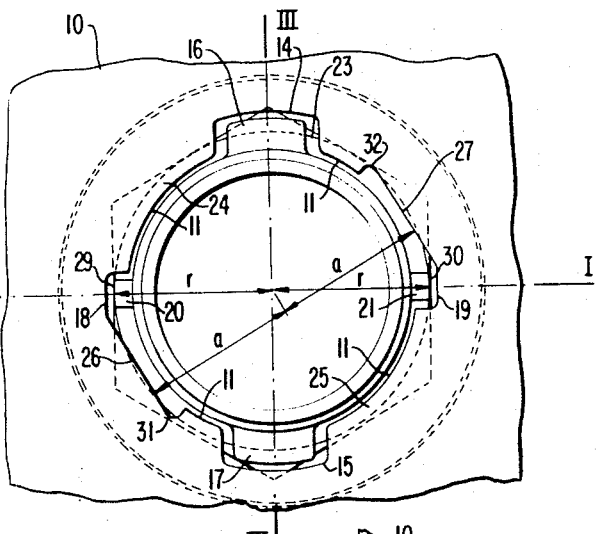
FIGURE 2 is a plan view on the securing arrangement taken in the direction of arrow II of FIGURE 1.

From the abutment position, the full-load stop 13 is adapted to be rotated in the counter-clockwise direction, as viewed in FIGURE 2, with respect to the socket 11 into a locking position. For this purpose, the full-load stop 13 is provided with a hexagonal portion 34. During this rotary movement, the cam portions 16 and 17 of the first type come into engagement with the radial abutment portions 24 and 25 and the cam portions 20 and 21 of the second type come into engagement with a respective cam track 26 and 27 each. The abutment portions 24 and 25 and the cam tracks 26 and 27 are rigid, shaped parts or molded bodies of the socket 11. The interior spacing $a$ of the cam tracks 26 and 27 from the axis 28 of the extension 12 is smaller than the radius $r$, in relation to this axis, of the engaging surfaces 29 and 30 at the cam portions 20 and 21 engaging with the cam tracks 26 and 27.

The cam portions 20 and 21 are elastically deformed in the direction toward the axis 28 by the cam tracks 26 and 27.

In the locking position (not illustrated) of the extension 12 with respect to the socket 11, the cam portions 16 and 17 abut against the abutment portions 24 and 25 of the socket 11 whereas the cam portions 20 and 21 are no longer in engagement with the cam tracks 26 and 27 but are arranged in additional grooves 31 and 32 of the socket 11. The distance of these additional grooves 31 and 32 from the axis 28 and the shape thereof is so selected that the elastic deformation of the cam portions 20 and 21 by the cam tracks 26 and 27 is at least partially lifted or eliminated again. As a result thereof, the backward rotation of the extension 12 out of the locking position into the illustrated abutment position is again possible only by means of an elastic deformation of the cam portions 20 and 21.

The fire wall 10 is sealed by the elastic ring 23 with respect to the full-load stop 13. The elastic deformation of the ring 23 may be utilized, on the one hand, for the compensation of manufacturing tolerances and, on the other, for the production of an abutment pressure or abutment force between the parts 10 and 22, on the one hand, with the parts 16, 17 and 24, 25, on the other.

In order to facilitate the movement of the extension 12 between abutment and locking position, the cam portions 16 and 17 of the first type are provided on the side thereof facing the socket 11 with engaging surfaces 33 inclined with respect to the socket.

While I have shown and described only one embodiment in accordance with the present invention, it is understood that the same is not limited thereto but is susceptible of numerous changes and modifications as known to a person skilled in the art.

I claim:

1. A securing arrangement of a pin part at a wall, especially of a full-load stop for the drive pedal of vehicles, comprising socket means provided in the wall, pin means having an extension operable to be axially inserted form-lockingly into said socket means up to an abutment position, the extension including at least one radial cam means of a first type for its axial locking and at least one radial cam means of a second type for its locking in the circumferential direction with respect to the socket means, the socket means being provided with the axial insertion of the extension into the abutment position with corresponding axial groove means for each cam means both of the first and second type, the cam means of the first type being axially offset to the corresponding groove means in the abutment position whereas the cam means of the second type engaging at least over a part of the axial extent thereof in the corresponding groove means, the groove means for the cam means of the second type passing over in the same circumferential direction into cam track means whose perpendicular distance to the axis of the extension is smaller than the corresponding distance of engaging surfaces for these cam track means provided at the associated cam means, and the extension being rotatable with respect to the socket means from the abutment position into a locking position so that the cam means of the first type come into engagement with corresponding radial abutment means provided at the socket means and the cam means of the second type come into engagement with the cam track means.

2. An arrangement according to claim 1, wherein said extension is cylindrical.

3. An arrangement according to claim 1, wherein the cam means of the second type are elastic in the axial direction.

4. An arrangement according to claim 3, wherein the cam means of the second type are arranged in the locking position within such groove means of the socket means as effect at least a partial unstressing of the cam means of the second type elastically deformed at the cam track means.

5. An arrangement according to claim 4, wherein the cam means of the second type are constructed in one piece with the extension.

6. An arrangement according to claim 4, wherein the cam means of the second type and said extension are constructed in one piece from synthetic resinous material.

7. An arrangement according to claim 5, wherein said extension and the pin part are made in one piece.

8. An arrangement according to claim 6, wherein the extension and the pin part are constructed in one piece from synthetic resinous material.

9. An arrangement according to claim 7, wherein the pin part includes a collar, and wherein the extension adjoins said collar.

10. An arrangement according to claim 9, further comprising ring-shaped elastic sealing means between the socket means and said collar.

11. An arrangement according to claim 10, wherein the pin part is provided with engaging surfaces for a work tool.

12. An arrangement according to claim 11, wherein the cam means of the first type are provided with engaging surfaces inclined with respect to a diametric plane of the extension.

13. An arrangement according to claim 1, wherein the cam means of the second type are arranged in the locking position within such groove means of the socket means as effect at least a partial unstressing of the cam means of the second type elastically deformed at the cam track means.

14. An arrangement according to claim 13, wherein the pin part includes a collar, and wherein the extension adjoins said collar.

15. An arrangement according to claim 14, further comprising ring-shaped elastic sealing means between the socket means and said collar.

16. An arrangement according to claim 15, wherein the cam means of the first type are provided with engaging surfaces inclined with respect to a diametric plane of the extension.

17. An arrangement according to claim 1, wherein the pin part is provided with engaging surfaces for a work tool.

18. An arrangement according to claim 1, wherein the pin part includes a collar, and wherein the extension adjoins said collar.

19. An arrangement according to claim 18, further comprising ring-shaped elastic sealing means between the socket means and said collar.

20. An arrangement according to claim 1, wherein the cam means of the first type are provided with engaging surfaces inclined with respect to a diametric plane of the extension.

21. An arrangement according to claim 20, wherein the cam means of the second type are elastic in the axial direction.

References Cited

UNITED STATES PATENTS

| 1,131,399 | 3/1915 | McGinley | 285—203 X |
| 3,232,644 | 2/1966 | Pfeifer et al. | 11—194 |

FOREIGN PATENTS 567,505  1/1933  Germany.

THOMAS F. CALLAGHAN, Primary Examiner

U.S. Cl. X.R.

285—203, 360